(12) United States Patent
Kitagawa et al.

(10) Patent No.: US 9,698,425 B2
(45) Date of Patent: Jul. 4, 2017

(54) ELECTRODE MATERIAL AND METHOD FOR PRODUCING THE SAME

(71) Applicant: SUMITOMO OSAKA CEMENT CO., LTD., Chiyoda-ku, Tokyo (JP)

(72) Inventors: Takao Kitagawa, Tokyo (JP); Hirofumi Yasumiishi, Tokyo (JP); Masaru Uehara, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 14/567,384

(22) Filed: Dec. 11, 2014

(65) Prior Publication Data

US 2015/0099175 A1  Apr. 9, 2015

Related U.S. Application Data

(63) Continuation of application No. 13/993,403, filed as application No. PCT/JP2011/077394 on Nov. 28, 2011, now abandoned.

(30) Foreign Application Priority Data

Dec. 17, 2010 (JP) .................................. 2010-282353
Sep. 22, 2011 (JP) .................................. 2011-207833

(51) Int. Cl.
  *H01M 4/131* (2010.01)
  *H01M 4/62* (2006.01)
  (Continued)

(52) U.S. Cl.
  CPC ............ *H01M 4/625* (2013.01); *C01B 31/02* (2013.01); *H01M 4/131* (2013.01); *H01M 4/133* (2013.01);
  (Continued)

(58) Field of Classification Search
  CPC ...... H01M 4/133; H01M 4/625; H01M 4/366; H01M 4/485; H01M 4/5825; H01M 2004/021
  See application file for complete search history.

(56) References Cited

U.S. PATENT DOCUMENTS

2004/0137328 A1* 7/2004 Kim et al. ................. 429/231.8
2004/0214087 A1* 10/2004 Sheem et al. ............. 429/231.8
(Continued)

FOREIGN PATENT DOCUMENTS

DE   WO 2010130684 A1 * 11/2010 ............ H01M 4/366
EP          2124272 A1   11/2009
(Continued)

OTHER PUBLICATIONS

International Search Report for corresponding International Patent Application No. PCT/JP2011/077394 (mailed Feb. 28, 2012).
(Continued)

*Primary Examiner* — Jonathan Jelsma
(74) *Attorney, Agent, or Firm* — Merchant & Gould P.C.

(57) ABSTRACT

The present invention provides an electrode material in which unevenness in a supporting amount of a carbonaceous film is less when using an electrode-active material having a carbonaceous film on a surface thereof as the electrode material, and which is capable of improving conductivity, and a method for producing the electrode material. The electrode material includes an aggregate formed by aggregating an electrode-active material in which a carbonaceous film is formed on a surface. In the electrode material, an average particle size of the aggregate is 0.5 to 100 μm, a volume density of the aggregate is 50 to 80 vol % of a volume density in a case in which the aggregate is a solid, and 80% or more of the surface of the electrode-active material is covered with the carbonaceous film. Alternatively, the electrode material includes an aggregate formed (Continued)

by aggregating electrode-active material particles in which a carbonaceous film is formed on a surface. In the electrode material, an average particle size of the aggregate is 0.5 to 100 μm, a pore size (D50) when an accumulated volume percentage of a pore size distribution of the aggregate is 50% is 0.1 to 0.2 μm, and porosity of the aggregate is 15 to 50 vol % with respect to a volume in a case in which the aggregate is a solid.

6 Claims, 2 Drawing Sheets

(51) Int. Cl.
| | | |
|---|---|---|
| H01M 4/133 | (2010.01) | |
| H01M 4/485 | (2010.01) | |
| H01M 4/505 | (2010.01) | |
| H01M 4/525 | (2010.01) | |
| C01B 31/02 | (2006.01) | |
| H01M 4/36 | (2006.01) | |
| H01M 4/58 | (2010.01) | |
| H01M 4/02 | (2006.01) | |

(52) U.S. Cl.
CPC ........... *H01M 4/366* (2013.01); *H01M 4/485* (2013.01); *H01M 4/505* (2013.01); *H01M 4/525* (2013.01); *H01M 4/5825* (2013.01); *H01M 2004/021* (2013.01); *Y02E 60/122* (2013.01); *Y02P 70/54* (2015.11)

(56) References Cited

U.S. PATENT DOCUMENTS

| | | | |
|---|---|---|---|
| 2005/0247914 A1 | 11/2005 | Mao et al. | |
| 2006/0068287 A1 | 3/2006 | Morita et al. | |
| 2007/0054187 A1 | 3/2007 | Nuspl et al. | |
| 2009/0104530 A1 | 4/2009 | Shizuka et al. | |
| 2009/0142668 A1* | 6/2009 | Ishii | 429/231.8 |
| 2009/0155689 A1 | 6/2009 | Zaghib et al. | |
| 2010/0021820 A1* | 1/2010 | Ishii | 429/231.8 |
| 2010/0233540 A1 | 9/2010 | Choy et al. | |
| 2010/0233545 A1* | 9/2010 | Sano et al. | 429/231.5 |
| 2010/0261063 A1* | 10/2010 | Kitagawa et al. | 429/232 |
| 2010/0273054 A1* | 10/2010 | Cotton | H01M 4/131 429/221 |
| 2010/0279117 A1 | 11/2010 | Gu | |
| 2010/0323245 A1* | 12/2010 | Liang | B82Y 30/00 429/231.5 |
| 2011/0002072 A1 | 1/2011 | Hara et al. | |
| 2011/0037019 A1 | 2/2011 | Nakano et al. | |
| 2011/0195308 A1* | 8/2011 | Lee et al. | 429/213 |
| 2011/0262811 A1 | 10/2011 | Kinoshita et al. | |
| 2012/0003540 A1 | 1/2012 | Nakano et al. | |
| 2012/0129052 A1* | 5/2012 | Bauer | H01M 4/366 429/231.1 |
| 2013/0302673 A1 | 11/2013 | Ravet et al. | |
| 2014/0272593 A1 | 9/2014 | Ooishi et al. | |

FOREIGN PATENT DOCUMENTS

| | | |
|---|---|---|
| EP | 2339675 | 6/2011 |
| EP | 2654110 | 10/2013 |
| JP | A-2000-58040 | 2/2000 |
| JP | A-2001-015111 | 1/2001 |
| JP | A-2002-110162 | 4/2002 |
| JP | A-2003-308845 | 10/2003 |
| JP | A-2004-296367 | 10/2004 |
| JP | A-2005-123107 | 5/2005 |
| JP | A-2005-135925 | 5/2005 |
| JP | A-2005-158401 | 6/2005 |
| JP | A-2006-032241 | 2/2006 |
| JP | A-2007-511458 | 5/2007 |
| JP | A-2007-173134 | 7/2007 |
| JP | A-2007-250417 | 9/2007 |
| JP | A-2009-129587 | 6/2009 |
| JP | A-2009-152188 | 7/2009 |
| JP | A-2009-544563 | 12/2009 |
| JP | A-2010-157405 | 7/2010 |
| JP | A-2010-218884 | 9/2010 |
| JP | A-2010-232091 | 10/2010 |
| JP | A-2010-251302 | 11/2010 |
| JP | A-2011-15111 | 1/2011 |
| JP | A-2011-076820 | 4/2011 |
| JP | A-2011-210649 | 10/2011 |
| JP | A-2012-104290 | 5/2012 |
| JP | A-2012/133888 | 7/2012 |
| JP | A-2012-524982 | 10/2012 |
| KR | 10-2010-0044727 | 4/2010 |
| WO | WO 00/60680 A1 | 10/2000 |
| WO | WO 2005/051840 A1 | 6/2005 |
| WO | WO 2008-077447 A1 | 7/2008 |
| WO | WO 2008/081944 A1 | 7/2008 |
| WO | WO 2009/131095 A1 | 10/2009 |
| WO | WO 2010/124384 A1 | 11/2010 |
| WO | WO 2011/033707 A1 | 3/2011 |

OTHER PUBLICATIONS

Notification from Japanese Patent Office for corresponding Japanese Patent Application No. 2010-282353 (mailed Oct. 2, 2012).
"Comparative Table of claims 1 to 7 and Citations" from Japanese Patent Office for corresponding Japanese Patent Application No. 2010-282353 (mailed Oct. 2, 2012).
Notification from Japanese Patent Office for Japanese Patent Application No. 2010-282353 (mailed Oct. 2, 2012).
"Comparative Table of claims 1 to 5 and Publications" from Japanese Patent Office for Japanese Patent Application No. 2010-282353 (mailed Nov. 25, 2014).
Decision of Rejection from Japanese Patent Office for Japanese Patent Application No. 2010-282353 (mailed Jan. 13, 2015).
Decision of Rejection from Japanese Patent Office for Japanese Patent Application No. 2011-207833 (mailed Jan. 13, 2015).
Office Action for U.S. Appl. No. 13/993,403 mailed Jan. 27, 2015.
Wang et al. "Preparation and characteristic of carbon-coated Li4Ti5O12 anode material," *J. of Power Sources, Elsevier SA.,* 174(2):1109-1112 (2007).
Kim et al. "Enhancement of electrochemical performance of lithium iron phosphate by controlled sol-gel synthesis" *Electrochimica Acta*. 53(28):8258-8264 (Nov. 30, 2008).
Comparative Table of claims 1 to 8 and Publications.
European Search Report for EP Application No. 11848684.4 mailed Mar. 23, 2015 (4 pages).
International Search Report for PCT/JP2012/072589 mailed Oct. 9, 2012 (4 pages).
Notification (Information Statement) for JP 2011-207832 mailed Mar. 25, 2014 (5 pages).
Office Action for U.S. Appl. No. 14/345,520 mailed Feb. 20, 2015 (10 pages).
European Search Report for EP 12833286.3 mailed Mar. 3, 2015 (10 pages).
Office Action for U.S. Appl. No. 14/202,346 mailed Feb. 20, 2015 (11 pages).
Fergus, "Recent developments in cathode materials for lithium ion batteries," *Journal of Power Sources,* 195(4):939-954 (2010).
Chen et al., "Reducing Carbon in LiFePO$_4$/C Composite Electrodes to Maximize Specific Energy, Volumetric Energy, and Tap Density," *Journal of the Electrochemical Society,* 149(9):A1184-A1189 (2002).
European Office Action for European Patent Application No. 12833286.3 (mailed Jan. 7, 2016).
Office Action for U.S. Appl. No. 14/345,520 (mailed Feb. 19, 2016).
Office Action for corresponding U.S. Appl. No. 14/345,520 (mailed Feb. 13, 2017).

* cited by examiner

ELECTRODE MATERIAL AND METHOD FOR PRODUCING THE SAME

This application is a Continuation of U.S. Ser. No. 13/993,403, filed 12 Jun. 2013, which is a U.S. National Stage application under 35 U.S.C. §371 of International Patent Application No. PCT/JP2011/077394 filed 28 Nov. 2011, which claims the benefit of priority to Japanese Patent Application No. 2010-282353 filed 17 Dec. 2010 and Japanese Patent Application No. 2011-207833, filed 22 Sep. 2011, the disclosures of all of which are hereby incorporated by reference in their entireties. The International application was published in Japanese on 21 Jun. 2012 as WO 2012/081383.

TECHNICAL FIELD

The present invention relates to an electrode material and a method for producing the same, and more particularly, to an electrode material suitable for use in a positive electrode material for a battery, in particular, a positive electrode material for a lithium ion battery, and to a method for producing the electrode material.

BACKGROUND

In recent years, as a battery that meets the expectations for miniaturization, lightness, and high capacity, a non-aqueous electrolyte-based secondary battery such as a lithium ion battery has been suggested, and has been put into practical use.

The lithium ion battery includes positive electrode and negative electrode that have properties capable of reversibly intercalating and deintercalating lithium ions, and a non-aqueous electrolyte.

With regard to a negative electrode material of the lithium ion battery, as a negative electrode-active material, Li-containing metal oxides such as a carbon-based material and lithium titanate ($Li_4Ti_5O_{12}$) that have properties capable of reversibly intercalating and deintercalating lithium ions have been used.

On the other hand, as a positive electrode material of the lithium ion battery, an electrode material mixture, which contains a Li-containing metal oxide such as iron lithium phosphate ($LiFePO_4$) having properties capable of reversibly intercalating and deintercalating lithium ions as a positive electrode-active material, a binder, and the like, has been used. In addition, this electrode material mixture is applied on a surface of metal foil called a current collector to form a positive electrode of the lithium ion battery.

Since the lithium ion battery is light in weight and small in size, and has high energy compared to a secondary battery such as a lead battery, a nickel-cadmium battery, a nickel-hydrogen battery, and the like in the related art, the lithium ion battery has been used as a power supply of portable electronic apparatuses such as a cellular phone and a note-type personal computer. In addition, in recent years, the lithium ion battery has been reviewed as a high-output power supply of an electric vehicle, a hybrid vehicle, an electromotive tool, and the like, and high-speed charge and discharge characteristics have been required for the battery that is used as the high-output power supply.

However, the electrode material, which contains an electrode-active material, for example, the Li-containing metal oxide having properties capable of reversibly intercalating and deintercalating lithium ions, has a problem in that conductivity is low. Therefore, there is suggested an electrode material in which a particle surface of the electrode-active material is covered with an organic component that is a carbon source, the organic component are carbonized to form a carbonaceous film on a surface of the electrode-active material, and carbon of the carbonaceous film is interposed as an electronic conductive material to increase the conductivity of the electrode material (refer to PTL 1).

CITATION LIST

Patent Literature

[PTL 1] Japanese Laid-Open Patent Publication No. 2001-15111

SUMMARY OF INVENTION

Technical Problem

However, when using the electrode-active material as a battery material of a lithium ion battery, the conductivity is requisite, and it is preferable that the conductivity of the electrode-active material be as high as possible.

However, in an electrode material that is formed by baking an electrode-active material supporting an organic compound or a precursor of the electrode-active material in a non-oxidizing atmosphere, an aromatic carbon compound generated due to thermal decomposition of the organic compound during the baking condenses, and thus a carbonaceous film is formed on a surface of the electrode-active material. On the other hand, the aromatic carbon compound is volatile at a high temperature. Particularly, at a baking temperature of 500° C. to 1,000° C., the higher the concentration of a vaporized material of the aromatic carbon compound is, the more supporting amount of the carbonaceous film is, and the larger thickness of the film is. However, the lower the concentration of the vaporized material is, the less the supporting amount of the carbonaceous film is, and the lower the thickness of the film is.

Therefore, with regard to an assembly of primary particles of the electrode-active material, in a case where the electrode-active material is not aggregated, and even though the electrode-active material is aggregated, in a case where the resultant aggregate has a number of voids, when being baked in a non-oxidizing atmosphere, the concentration of the vaporized material of the aromatic carbon compound decreases, and the supporting amount of the carbonaceous film decreases as a whole or partially. Therefore, the thickness of the carbonaceous film decreases, and thus the coverage rate of the carbonaceous film decreases.

The invention has been made to solve the above-described problems, and an object thereof is to provide an electrode material in which unevenness in a supporting amount of the carbonaceous film is less when using an electrode-active material having a carbonaceous film formed on a surface thereof as the electrode material and which is capable of improving conductivity and a method for producing the electrode material.

Solution to Problem

The present inventors made a thorough investigation to solve the above-described problems. As a result, they found that with regard to a particle size distribution of an electrode-active material or a precursor of the electrode-active material in slurry containing the electrode-active material or the precursor of the electrode-active material, and an organic compound, when a ratio (D90/D10) of D90 to D10 of the particle size distribution is set to 5 to 30 during production of the electrode material, a volume density of an aggregate that is obtained may be set to 50 to 80 vol % of the volume density in a case in which the aggregate is a solid, and accordingly, a concentration of a vaporized material of an aromatic carbonaceous compound inside the aggregate may be raised, and as a result, a carbonaceous film in which unevenness is less may be supported on a surface of the electrode-active material inside the aggregate, and the present inventors accomplished the invention.

That is, according to an embodiment of the invention, an electrode material is provided including an aggregate formed by aggregating electrode-active material particles having a carbonaceous film formed on a surface. An average particle size of the aggregate is 0.5 to 100 μm. A volume density of the aggregate is 50 to 80 vol % of the volume density in a case in which the aggregate is a solid.

In the electrode material of the invention, it is preferable that 80% or more of the surface of the electrode-active material be covered with the carbonaceous film.

The aggregate may be a shell-like aggregate having a void at the inside thereof, and it is preferable that a ratio of an average film thickness of the carbonaceous film in an outer peripheral portion and an inner peripheral portion of an outer shell of the shell-like aggregate (a thickness of the carbonaceous film in the inner peripheral portion/a thickness of the carbonaceous film in the outer peripheral portion) be 0.7 to 1.3.

It is preferable that an amount of carbon in the carbonaceous film be 0.6 to 10 parts by mass on the basis of 100 parts by mass of the electrode-active material.

It is preferable that a tap density of the aggregate be 1.0 to 1.5 g/cm$^3$.

It is preferable that the electrode-active material contain one kind selected from the group consisting of lithium cobaltate, lithium nickelate, lithium manganate, lithium titanate, and $Li_xA_yD_zPO_4$ (provided that, A is one or more kinds selected from the group consisting from Co, Mn, Ni, Fe, Cu, and Cr, D is one or more kinds selected from the group consisting of Mg, Ca, S, Sr, Ba, Ti, Zn, B, Al, Ga, In, Si, Ge, Sc, Y, and rare-earth elements, $0<x<2$, $0<y<1.5$, and $0 \leq z<1.5$) as a main component.

According to another embodiment of the invention, a method for producing an electrode material is provided. The method include: drying slurry which contains an electrode-active material or a precursor of the electrode-active material, and an organic compound, and in which a ratio (D90/D10) of D90 to D10 of a particle size distribution of the electrode-active material or the precursor of the electrode-active material is 5 to 30; and baking the resultant dried product that is obtained at 500° C. to 1,000° C. in a non-oxidizing atmosphere.

In addition, the present inventors made a thorough investigation to solve the above-described problems. As a result, they found that in slurry containing an electrode-active material or a precursor of the electrode-active material, and an organic compound, when a ratio (D90/D10) of a particle size (D90) when an accumulated volume percentage of a particle size distribution of the electrode-active material or the precursor of the electrode-active material is 90% to a particle size (D10) when the accumulated volume percentage is 10% is 5 to 30 during production of the electrode material, a pore size (D50) when the accumulated volume percentage of the pore size distribution of the aggregate that is obtained is 50% may be set to 0.1 to 0.2 μm, porosity of the aggregate may be set to 15 to 50 vol % with respect to a volume in a case in which the aggregate is a solid, and accordingly, a concentration of a vaporized material of an aromatic carbonaceous compound inside the aggregate may be raised, and as a result, a carbonaceous film in which unevenness is less may be supported on a surface of the electrode-active material inside the aggregate, and the present inventors accomplished the invention.

That is, according to still another embodiment of the invention, an electrode material is provided including an aggregate formed by aggregating electrode-active material particles having a carbonaceous film formed on a surface. An average particle size of the aggregate is 0.5 to 100 μm. A pore size (D50) when an accumulated volume percentage of a pore size distribution of the aggregate is 50% is 0.1 to 0.2 μm. Porosity of the aggregate is 15 to 50 vol % with respect to a volume in a case in which the aggregate is a solid.

In the electrode material of the invention, it is preferable that 80% or more of the surface of the electrode-active material be covered with the carbonaceous film.

The aggregate may be a shell-like aggregate having a void at the inside thereof, and it is preferable that a ratio of an average film thickness of the carbonaceous film in an outer peripheral portion and an inner peripheral portion of an outer shell of the shell-like aggregate (a thickness of the carbonaceous film in the inner peripheral portion/a thickness of the carbonaceous film in the outer peripheral portion) be 0.7 to 1.3.

It is preferable that an amount of carbon in the carbonaceous film be 0.6 to 10 parts by mass on the basis of 100 parts by mass of the electrode-active material.

It is preferable that a tap density of the aggregate be 1.0 to 1.5 g/cm$^3$.

It is preferable that the electrode-active material contains one kind selected from the group consisting of lithium cobaltate, lithium nickelate, lithium manganate, lithium titanate, and $Li_xA_yD_zPO_4$ (provided that, A is one or more kinds selected from the group consisting from Co, Mn, Ni, Fe, Cu, and Cr, D is one or more kinds selected from the group consisting of Mg, Ca, S, Sr, Ba, Ti, Zn, B, Al, Ga, In, Si, Ge, Sc, Y, and rare-earth elements, $0<x<2$, $0<y<1.5$, and $0 \leq z<1.5$) as a main component.

According to still another embodiment of the invention, a method for producing an electrode material is provided. The method includes: drying slurry which contains an electrode-active material or a precursor of the electrode-active material, and an organic compound, and in which a ratio (D90/D10) of a particle size (D90) when an accumulated volume percentage of a particle size distribution of the electrode-active material or the precursor of the electrode-active material is 90% to a particle size (D10) when the accumulated volume percentage is 10% is 5 to 30; and baking the resultant dried product that is obtained at 500° C. to 1,000° C. in a non-oxidizing atmosphere.

Advantageous Effects of Invention

According to the electrode material of the invention, the average particle size of the aggregate formed by aggregating electrode-active material particles having a carbonaceous film formed on a surface thereof is set to 0.5 to 100 μm, and a volume density of the aggregate is set to 50 to 80 vol % of the volume density in a case in which the aggregate is a solid, and thus unevenness in a supporting amount of the carbonaceous film formed on the surface of the electrode-active material particles may be reduced, and as a result, unevenness in conductivity of the electrode-active material may be reduced. Accordingly, when the electrode-active material is used as an electrode material of a lithium ion battery, internal resistance may be reduced.

When the electrode-active material in which the unevenness in conductivity is reduced is used as the electrode material of the lithium ion battery, a reaction related to intercalation and deintercalation of lithium ions may be uniformly carried out in the entirety of the surface of the electrode-active material, and thus the internal resistance may be reduced.

In addition, the internal resistance mentioned here represents internal resistance at a site at which reaction resistance related to intercalation and deintercalation of lithium ions is high in a particle, which does not have the carbonaceous film formed on a surface thereof or in which the thickness of the carbonaceous film is small, of the electrode-active material. Specifically, when the electrode-active material is used as an electrode-active material of the lithium ion battery, the internal resistance is shown as a magnitude of voltage drop at the final stage of discharge. That is, in an electrode-active material in which the intercalation and deintercalation reaction of lithium ions is uniformly carried out over the entirety of the surface of the electrode-active material, the voltage drop at the final stage of discharge is small. Conversely, in an electrode-active material in which the intercalation and deintercalation reaction resistance of lithium ions is high at a part of the surface of the electrode-active material, the voltage drop at the final stage of discharge becomes significant.

According to the method for producing an electrode material of the invention, slurry, which contains an electrode-active material or a precursor of the electrode-active material, and an organic compound, and in which a ratio (D90/D10) of D90 to D10 of a particle size distribution of the electrode-active material or the precursor of the electrode-active material is 5 to 30, is dried, and the resultant dried product that is obtained is baked at 500° C. to 1,000° C. in a non-oxidizing atmosphere. Accordingly, unevenness in a supporting amount of the carbonaceous film formed on a surface of the electrode-active material may be reduced. As a result, an electrode material capable of reducing unevenness in conductivity of the electrode-active material may be easily produced.

According to another electrode material of the invention, an average particle size of the aggregate formed by aggregating electrode-active material particles having a carbonaceous film formed on a surface is set to 0.5 to 100 µm, and a pore size (D50) when an accumulated volume percentage of a pore size distribution of the aggregate is 50% is set to 0.1 to 0.2 µm, and the porosity of the aggregate is set to 15 to 50 vol % with respect to a volume in a case in which the aggregate is a solid. Accordingly, unevenness in a supporting amount of the carbonaceous film formed on the surface of the electrode-active material particles may be made small, and thus unevenness in conductivity of the electrode-active material may be reduced. As a result, when the electrode-active material is used as the electrode material of the lithium ion battery, the internal resistance may be reduced.

In addition, when the electrode-active material in which the unevenness in conductivity is reduced is used as the electrode material of the lithium ion battery, a reaction related to intercalation and deintercalation of lithium ions may be uniformly carried out in the entirety of the surface of the electrode-active material, and thus the internal resistance may be reduced.

According to another method for producing an electrode material of the invention, slurry, which contains an electrode-active material or a precursor of the electrode-active material, and an organic compound, and in which a ratio (D90/D10) of D90 to D10 of a particle size distribution of the electrode-active material or the precursor of the electrode-active material is 5 to 30, is dried, and the resultant dried product that is obtained is baked at 500° C. to 1,000° C. in a non-oxidizing atmosphere. Accordingly, unevenness in a supporting amount of the carbonaceous film formed on the surface of the electrode-active material may be reduced. As a result, an electrode material capable of reducing unevenness in conductivity of the electrode-active material may be easily produced.

DESCRIPTION OF EMBODIMENTS (First Embodiment)

Figure 1:
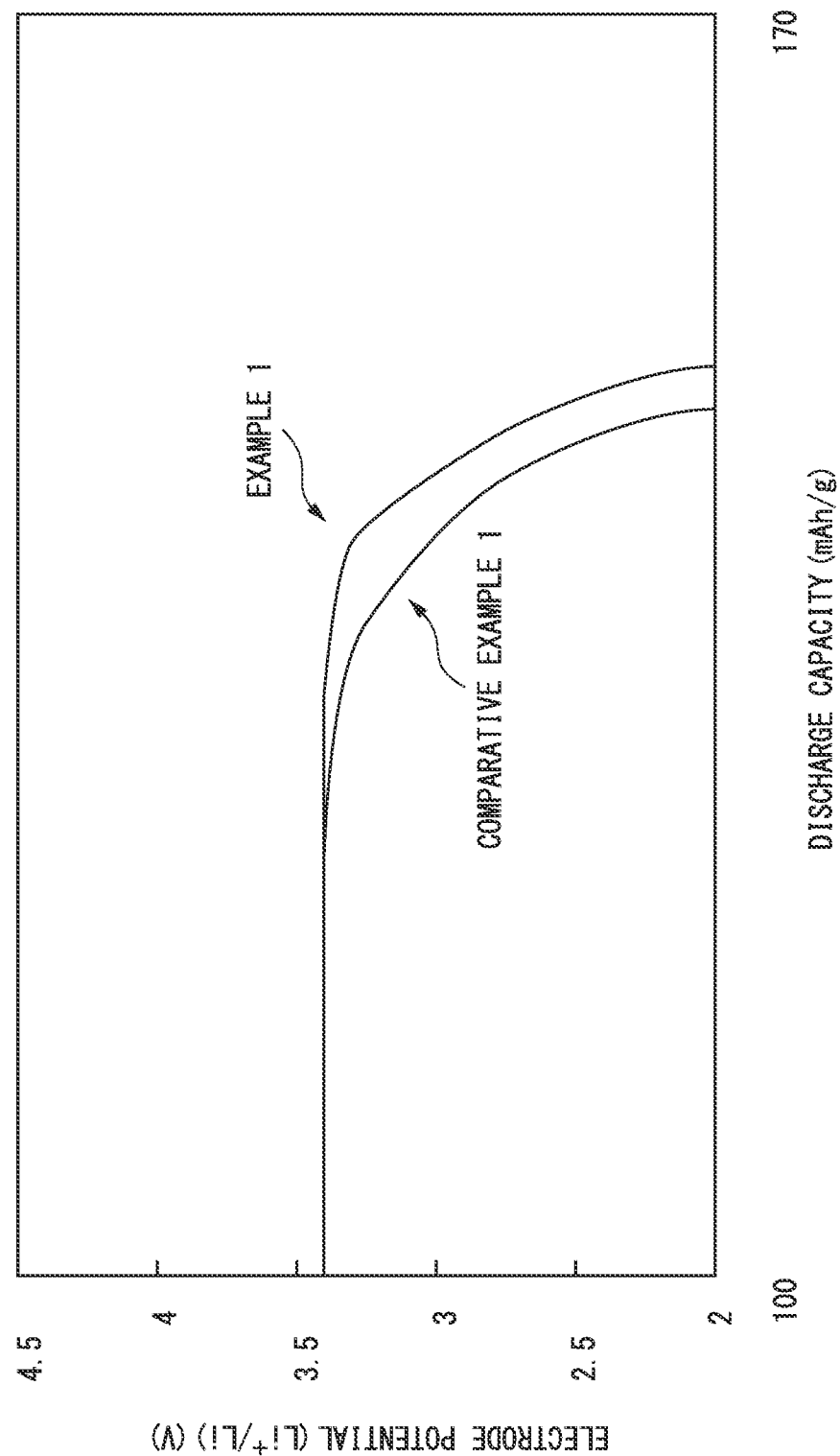
FIG. 1 is a diagram illustrating charge and discharge characteristics of Example 1 and Comparative Example 1 of the invention at room temperature, respectively.

An embodiment (first embodiment) of an electrode material and a method for producing the same of the invention will be described.

In addition, this embodiment makes a description in detail for easy comprehension of the gist of the invention, and does not limit the invention unless otherwise stated.

[Electrode Material]

An electrode material of this embodiment includes an aggregate formed by aggregating electrode-active material particles having a carbonaceous film formed on a surface, an average particle size of the aggregate is 0.5 to 100 µm, and a volume density of the aggregate is 50 to 80 vol % of the volume density in a case in which the aggregate is a solid.

Here, it is assumed that a solid aggregate is an aggregate in which a void is not present at all, and a density of an actual aggregate is the same as a theoretical density of an electrode-active material.

Here, the aggregate that is formed by aggregating each electrode-active material having the carbonaceous film formed on a surface thereof represents an aggregate in which the electrode-active materials having the carbonaceous film formed on a surface thereof are aggregated in a point contact state, and thus a contact portion of the electrode-active materials becomes a neck shape having a small cross-sectional area, whereby the electrode-active materials are strongly connected to each other. In this manner, the contact portion between the electrode-active materials has a neck shape having a small cross-sectional area, and thus channel-shaped (network-shaped) voids inside the aggregate have a three-dimensionally expanded structure.

In addition, when the volume density of the aggregate is 50 vol % or more, the aggregate becomes dense, and the strength of the aggregate increases. Accordingly, for example, when the electrode-active material is mixed with a binder, a conductive auxiliary agent, and a solvent to prepare electrode slurry, the aggregate is not likely to collapse. As a result, an increase in viscosity of the electrode slurry is suppressed, and flowability is maintained. Accordingly, coating properties are improved, and filling properties of the electrode-active material in a coated film of the electrode slurry are also improved. In a case where the aggregate collapses during preparation of the electrode slurry, since a necessary amount of the binder that binds the electrode-active materials increases, the viscosity of the electrode slurry increases, and a concentration of a solid content of the electrode slurry decreases. As a result, a percentage of the electrode-active material in the weight of a positive electrode film decreases, and thus this case is not preferable.

It is preferable that the electrode-active material contain one kind selected from the group consisting of lithium cobaltate, lithium nickelate, lithium manganate, lithium titanate, and $Li_xA_yD_zPO_4$ (provided that, A is one or more kinds selected from the group consisting from Co, Mn, Ni, Fe, Cu, and Cr, D is one or more kinds selected from the group consisting of Mg, Ca, S, Sr, Ba, Ti, Zn, B, Al, Ga, In, Si, Ge, Sc, Y, and rare-earth elements, $0<x<2$, $0<y<1.5$, and $0\leq z<1.5$) as a main component.

Here, with regard to A, Co, Mn, Ni, and Fe are preferable, and with regard to D, Mg, Ca, Sr, Ba, Ti, Zn, and Al are preferable from the viewpoints of a high discharge potential, abundant resources, stability, and the like.

Here, the rare-earth elements represent 15 elements of La, Ce, Pr, Nd, Pm, Sm, Eu, Gd, Tb, Dy, Ho, Er, Tm, Yb, and Lu that belong to lanthanide series.

In the electrode-active material, 80% or more of a surface thereof is covered with a carbonaceous film, and preferably 90% or more in order for a reaction related to intercalation and deintercalation of lithium ions to be uniformly carried out over the entirety of the surface of the electrode-active material during use as an electrode material of a lithium ion battery.

A coverage rate of the carbonaceous film may be measured using a transmission electron microscope (TEM), and an energy dispersive X-ray spectrometer (EDX). Here, when the coverage rate of the carbonaceous film is less than 80%, a covering effect of the carbonaceous film becomes insufficient, and thus when the intercalation and deintercalation reaction of lithium ions is carried out on a surface of the electrode-active material, reaction resistance related to the intercalation and deintercalation of lithium ions at a site at which the carbonaceous film is not formed increases, and thus voltage drop at a final stage of discharge becomes significant. Therefore, this range is not preferable.

It is preferable that an amount of carbon in the carbonaceous film be 0.6 to 10 parts by mass on the basis of 100 parts by mass of the electrode-active material, and more preferably 0.8 to 2.5 parts by mass.

Here, the reason why the amount of carbon in the carbonaceous film is limited to the above-described range is as follows. When the amount of carbon is less than 0.6 parts by mass, the coverage rate of the carbonaceous film becomes less than 80%. Therefore, when a battery is formed, a discharge capacity at a high-speed charge and discharge rate decreases. As a result, it is difficult to realize a sufficient charge and discharge rate performance. On the other hand, when the amount of carbon exceeds 10 parts by mass, the amount of carbonaceous film relative to the electrode-active material increases. Therefore, carbon is contained in an amount larger than an amount necessary to obtain conductivity, and thus in a state of the aggregate, the mass and volume density of carbon decrease. As a result, an electrode density decreases, and thus a battery capacity of the lithium ion battery per unit volume decreases.

It is preferable that an average particle size of the aggregate be 0.5 to 100 µm, and more preferably 1 to 20 µm.

Here, the reason why the average particle size of the aggregate is limited to the above-described range is as follows. When the average particle size is less than 0.5 µm, the aggregate is too fine, and thus there is a tendency for the aggregate to fly. Therefore, it is difficult to handle the aggregate during manufacturing of paste for electrode coating. On the other hand, when the average particle size exceeds 100 µm, when an electrode for a battery is manufactured, a possibility that an aggregate having a size larger than the film thickness of the electrode after being dried is present increases. Accordingly, it is difficult to maintain uniformity of the film thickness of the electrode.

The volume density of the aggregate may be measured using a mercury porosimeter, and it is preferable that the volume density be 50 to 80 vol % of the volume density in a case in which the aggregate is a solid, and more preferably, 55 to 75 vol %.

Here, when the volume density of the aggregate is less than 50 vol % of the volume density in the case in which the aggregate is a solid, a vapor concentration of an aromatic carbon compound in the void inside the aggregate of the electrode-active material becomes too low, and thus the film thickness of the carbonaceous film in the inner peripheral portion of the outer shell of the aggregate becomes small. Therefore, the internal resistance of the electrode-active material increases, and thus this range is not preferable. On the other hand, when the volume density of the aggregate exceeds 80 vol % of the volume density in the case in which the aggregate is a solid, the density inside the aggregate becomes too high, and thus a channel-shaped (network-shaped) void inside the aggregate decreases. As a result, a tarry material, which is generated during carbonization of the organic compound, is trapped inside the aggregate, and thus this range is not preferable.

It is preferable that a tap density of the aggregate be 1.0 to 1.5 g/cm$^3$.

Here, when the tap density of the aggregate is less than 1.0 g/cm$^3$, an amount of a solvent that is maintained in the void inside the aggregate and an aggregate gap increases during preparation of the electrode slurry, and thus a concentration of a solid content of the electrode slurry decreases. Therefore, the time necessary to dry a coated film formed by application of the electrode slurry becomes long, and thus this range is not preferable. On the other hand, when the tap density of the aggregate exceeds 1.5 g/cm$^3$, filling properties of the aggregate in the coated film obtained by the application of the electrode slurry increases too much. As a result, a solvent is not likely to vaporize at the time of drying the coated film, and thus this range is not preferable.

When this aggregate is made into a shell-like aggregate, it is preferable that the size of the void that is formed inside the aggregate be 80% or less of a diameter of aggregate particles, and more preferably 70% or less.

Here, when the size of the void exceeds 80%, it is difficult to maintain a shell shape of the aggregate, and thus the concentration of the vapor of the aromatic carbon compound inside the void becomes too low. As a result, the film thickness of the carbonaceous film in the inner peripheral portion of the outer shell of the aggregate becomes small, and the internal resistance of the electrode-active material increases, and thus this range is not preferable.

It is preferable that a ratio of average film thickness of the carbonaceous film in the outer peripheral portion and the inner peripheral portion of the outer shell of the shell-like aggregate (the thickness of the carbonaceous film in the inner peripheral portion/the thickness of the carbonaceous film in the outer peripheral portion) be 0.7 to 1.3.

Here, when the ratio of average film thickness of the carbonaceous film in the outer peripheral portion and the inner peripheral portion of the outer shell (the thickness of the carbonaceous film in the inner peripheral portion/the thickness of the carbonaceous film in the outer peripheral portion) is out of the above-described range, the thickness of the carbonaceous film in the outer peripheral portion or the inner peripheral portion of the outer shell of the aggregate becomes small. Therefore, the internal resistance of the electrode-active material increases, and thus this range is not preferable.

[Method for Producing Electrode Material]

A method for producing an electrode material of this embodiment includes drying slurry which contains an electrode-active material or a precursor of the electrode-active material, and an organic compound, and in which with regard to a particle size distribution of the electrode-active material or the precursor of the electrode-active material, a ratio (D90/D10) of D90 to D10 of the particle size distribution is 5 to 30, and baking the resultant dried product that is obtained at 500° C. to 1,000° C. in a non-oxidizing atmosphere.

Here, D90 represents a particle size when an accumulated vol % in the particle size distribution is 90%, and D10 represents a particle size when the accumulated vol % in the particle size distribution is 10%.

As described in the electrode material, it is preferable that the electrode-active material contain one kind selected from the group consisting of lithium cobaltate, lithium nickelate, lithium manganate, lithium titanate, and $Li_xA_yD_zPO_4$ (provided that, A is one or more kinds selected from the group consisting from Co, Mn, Ni, Fe, Cu, and Cr, D is one or more kinds selected from the group consisting of Mg, Ca, S, Sr, Ba, Ti, Zn, B, Al, Ga, In, Si, Ge, Sc, Y, and rare-earth elements, $0<x<2$, $0<y<1.5$, and $0\leq z<1.5$) as a main component.

Here, with regard to A, Co, Mn, Ni, and Fe are preferable, and with regard to D, Mg, Ca, Sr, Ba, Ti, Zn, and Al are preferable from the viewpoints of a high discharge potential, abundant resources, stability, and the like.

Here, the rare-earth elements represent 15 elements of La, Ce, Pr, Nd, Pm, Sm, Eu, Gd, Tb, Dy, Ho, Er, Tm, Yb, and Lu that belong to lanthanide series.

As a compound ($Li_xA_yD_zPO_4$ powder) expressed by $Li_xA_yD_zPO_4$, a compound, which is produced by a solid phase method, a liquid phase method, and a vapor phase method, or the like in the related art, may be used.

As the compound ($Li_xA_yD_zPO_4$ powder), for example, a compound ($Li_xA_yD_zPO_4$ powder) that is obtained by the following method may be appropriately used. The method includes: hydrothermally synthesizing a slurry mixture, which is obtained by mixing a Li source selected from the group consisting of lithium salts such as lithium acetate ($LiCH_3COO$) and lithium chloride (LiCl) or lithium hydroxide (LiOH), bivalent iron salts such as iron (II) chloride ($FeCl_2$), iron (II) acetate ($Fe(CH_3COO)_2$), and iron (II) sulfate ($FeSO_4$), phosphate compounds such as phosphoric acid ($H_3PO_4$), ammonium dihydrogen phosphate ($NH_4H_2PO_4$), diammonium hydrogen phosphate (($NH_4)_2HPO_4$), and water, using a pressure-resistant airtight container; washing a precipitate that is obtained with water to generate a cake-shaped precursor material; and baking the cake-shaped precursor material.

The $Li_xA_yD_zPO_4$ powder may be a crystalline particle, an amorphous particle, or a mixed crystal particle in which a crystalline particle and an amorphous particle coexist. Here, the reason why the $Li_xA_yD_zPO_4$ powder may be an amorphous particle is that when being thermally treated in a non-oxidizing atmosphere at 500° C. to 1,000° C., the amorphous $Li_xA_yD_zPO_4$ powder is crystallized.

The size of the electrode-active material is not particularly limited, but it is preferable that an average particle size of primary particles be 0.01 to 20 μm, and more preferably 0.02 to 5 μm.

Here, the reason why the average particle size of the primary particles of the electrode-active material is limited to the above-described range is as follows. When the average particle size of the primary particles is less than 0.01 μm, it is difficult to sufficiently cover the surface of each of the primary particles with a thin film-shaped carbon, and thus a discharge capacity at a high-speed charge and discharge rate becomes low. As a result, it is difficult to realize a sufficient charge and discharge rate performance, and thus this range is not preferable. On the other hand, when the average particle size of the primary particles exceeds 20 μm, the internal resistance of the primary particles increases. Therefore, the discharge capacity at a high-speed charge and discharge rate becomes insufficient, and thus this range is not preferable.

The shape of the electrode-active material is not particularly limited. However, from the viewpoints that an electrode material constituted by secondary particles having a spherical shape, particularly, a real spherical shape may be easily generated, it is preferable that the shape of the electrode-active material be a spherical shape, particularly a real spherical shape.

Here, the reason why it is preferable that the shape of the electrode-active material be a spherical shape is as follows. When preparing a paste for a positive electrode by mixing an electrode-active material, a binder resin (binding agent), and a solvent, an amount of solvent may be reduced, and the paste for the positive electrode may be easily plated on a current collector.

In addition, when the shape of the electrode-active material is a spherical shape, a surface area of the electrode-active material becomes the minimum, and thus a mixing amount of the binder resin (binding agent) that is added to an electrode material mixture may be the minimum. Accordingly, the internal resistance of the positive electrode that is obtained may be made small, and thus this shape is preferable.

Furthermore, there is a tendency for the electrode-active material to be closely packed, and thus a filled amount of the positive material per unit volume increases. Accordingly, an electrode density may be increased. As a result, high-capacity of the lithium ion battery may be realized, and thus this shape is preferable.

In addition, examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, and polyvalent alcohols.

When the total amount of the organic compound is converted to an amount of carbon, it is preferable that a mixing ratio of the electrode-active material and the organic compound be 0.6 to 10 parts by mass on the basis of 100 parts by mass of the electrode-active material, and more preferably 0.8 to 2.5 parts by mass.

Here, when the mixing ratio of the organic compound in terms of the amount of carbon is less than 0.6 parts by mass, the coverage rate of the carbonaceous film is less than 80%. Therefore, when a battery is formed, a discharge capacity at a high-speed charge and discharge rate decreases. As a result, it is difficult to realize a sufficient charge and discharge rate performance. On the other hand, when the mixing ratio of the organic compound in terms of the amount of carbon exceeds 10 parts by mass, the mixing ratio of the electrode-active material relatively decreases. Therefore, when a battery is formed, a battery capacity decreases, and the volume of the electrode-active material increases due to excessive supporting of the carbonaceous film. As a result, an electrode density decreases, and thus the battery capacity of the lithium ion battery per unit volume considerably decreases.

The electrode-active material and the organic compound may be dissolved or dispersed in water to prepare uniform slurry. During the dissolution or dispersion, a dispersant may be added.

A method of dissolving or dispersing the electrode-active material or the organic compound in water is not particularly limited as long as the electrode-active material may be dispersed, and the organic compound may be dissolved or dispersed. However, for example, a medium stirring type dispersing apparatus such as a planetary ball mill, a vibration ball mill, a bead mill, a painter shaker, and an attritor that stirs medium particles at a high speed is preferably used.

During the dissolution or dispersion, it is preferable to perform the stirring in such a manner that the electrode-active material is dispersed as a primary particle, and then the organic compound is dissolved. In this manner, a surface of the primary particle of the electrode-active material is covered with the organic compound. As a result, carbon originating from the organic compound is uniformly interposed between primary particles of the electrode-active material.

In addition, it is preferable to appropriately adjust dispersion conditions of the slurry such as a concentration of the electrode-active material or the organic compound in the slurry, a stirring time, and the like so that with regard to the particle size distribution of the electrode-active material or the precursor of the electrode-active material in the slurry, a ratio (D90/D10) of D90 to D10 of the particle size distribution becomes 5 to 30. According to this, a tap density of the aggregate that is obtained by spraying and drying the slurry becomes 1.0 g/cm$^3$.

Then, the slurry is sprayed and dried in the air and in a high-temperature atmosphere, for example, 70° C. to 250° C.

It is preferable that an average diameter of liquid droplets during the spraying be 0.05 to 100 μm, and more preferably 1 to 20 μm.

When the average diameter of the liquid droplets during the spraying is set within the above-described range, a dried product having an average particle size of 0.5 to 100 μm, and preferably 1 to 20 μm may be obtained.

Then, the dried product is baked in a non-oxidizing atmosphere at a temperature within a range of 500° C. to 1,000° C., and preferably 600° C. to 900° C. for 0.1 hours to 40 hours.

As the non-oxidizing atmosphere, an inert atmosphere of nitrogen ($N_2$), argon (Ar), or the like is preferable. In a case where it is desired to further suppress oxidization, a reducing atmosphere containing a reducing gas such as hydrogen ($H_2$) is preferable. In addition, a burnable or combustible gas such as oxygen ($O_2$) may be introduced to the inert atmosphere to remove an organic component that is vaporized in the non-oxidizing atmosphere during the baking.

In addition, the reason why the baking temperature is set to 500° C. to 1,000° C. is as follows. When the baking temperature is lower than 500° C., the decomposition reaction of an organic compound contained in the dried product does not progress sufficiently, and thus carbonization of the organic compound becomes insufficient. As a result, a highly resistive decomposed product of the organic material is generated in the aggregate that is obtained. On the other hand, when the baking temperature is higher than 1,000° C., Li in the electrode-active material is evaporated, and a compositional deviation occurs in the electrode-active material, and grain growth of the electrode-active material is promoted. As a result, the discharge capacity in the high charge and discharge rate decreases, and thus it is difficult to realize a sufficient charge and discharge rate performance.

Here, the particle size distribution of the aggregate that is obtained may be controlled by appropriately adjusting conditions during the baking of the dried product, for example, a temperature rising rate, the maximum holding temperature, a holding time, and the like.

As described above, the surface of the primary particles of the electrode-active material is covered with carbon that is generated by the thermal decomposition of the organic compound in the dried product, and thus aggregate including secondary particles in which carbon is interposed between the primary particles of the electrode-active material may be obtained.

This aggregate is used as the electrode material of this embodiment.

According to the electrode material of this embodiment, the average particle size of the aggregate formed by aggregating electrode-active material particles having a carbonaceous film formed on a surface thereof is set to 0.5 to 100 μm, and a volume density of the aggregate is set to 50 to 80 vol % of the volume density in a case in which the aggregate is a solid, and thus unevenness in a supporting amount of the carbonaceous film formed on a surface of the electrode-active material may be reduced, and thus unevenness in conductivity of the electrode-active material may be reduced. Accordingly, when the electrode-active material is used as an electrode material of a lithium ion battery, the internal resistance may be reduced.

According to the method for producing an electrode material of this embodiment, slurry, which contains an electrode-active material or a precursor of the electrode-active material, and an organic compound, and in which with regard to the particle size distribution of the electrode-active material or the precursor of the electrode-active material, a ratio (D90/D10) of D90 to D10 of the particle size distribution is 5 to 30, is dried, and the resultant dried product that is obtained is baked at 500° C. to 1,000° C. in a non-oxidizing atmosphere. Accordingly, unevenness in a supporting amount of the carbonaceous film formed on the surface of the electrode-active material may be reduced. As a result, an electrode material capable of reducing unevenness in conductivity of the electrode-active material may be easily produced.

EXAMPLES

Hereinafter, the first embodiment of the invention will be described in detail referring to Examples 1 to 4, and Comparative Examples 1 to 3, but the invention is not limited by the examples.

In the examples, metal Li is used for a negative electrode to reflect the behavior of the electrode material itself on data, but, a negative electrode material such as a carbon material, a Li alloy, and $Li_4Ti_5O_{12}$ may be used. In addition, a solid electrolyte may be used instead of an electrolyte and a separator.

Example 1

Preparation of Electrode Material 4 mol lithium acetate ($LiCH_3COO$), 2 mol iron (II) sulfate ($FeSO_4$), and 2 mol phosphoric acid ($H_3PO_4$) were mixed to 2 L (liters) of water so that the entire amount became 4 L, whereby a uniform slurry mixture was prepared.

Then, this mixture was accommodated in an 8-L pressure-resistant airtight container, and hydrothermal synthesis was performed at 120° C. for one hour.

Then, a precipitate that was obtained was washed with water, whereby a cake-shaped precursor of the electrode-active material was obtained.

Then, 150 g (in terms of a solid content) of the precursor of the electrode-active material, an aqueous polyvinyl alcohol solution, which was obtained dissolving 20 g of polyvinyl alcohol in 200 g of water, as the organic compound, and 500 g of zirconia balls having a diameter of 5 mm as a medium particle were put into a ball mill, and a dispersion treatment was carried out after adjusting a stirring time of the ball mill so that D90/D10 of the particle size distribution of the precursor particle of the electrode-active material in the slurry became 7.

Then, the slurry that was obtained was sprayed in the air atmosphere at 180° C. and was dried to obtain a dried product having an average particle size of 6 μm.

Then, the dried product that was obtained was baked in a nitrogen atmosphere at 700° C. for one hour to obtain an aggregate having an average particle size of 6 μm, and this aggregate was set as an electrode material of Example 1.

(Evaluation of Electrode Material)

A volume density of the aggregate of the electrode material, a maximum void inside the aggregate, a ratio of an average film thickness of a carbonaceous film (a thickness of the carbonaceous film in an inner peripheral portion/a thickness of the carbonaceous film in an outer peripheral portion), a tap density, and a coverage rate of the carbonaceous film were evaluated, respectively.

Evaluation method is as follows.

(1) Volume Density of Aggregate

The volume density of the aggregate was measured using a mercury porosimeter.

(2) Maximum Void Inside Aggregate

A cross-section of the aggregate was observed using a scanning electron microscope (SEM) to measure a maximum value of the void inside the aggregate.

(3) Ratio of Average Film Thickness of Carbonaceous Film

The carbonaceous film of the aggregate was observed using a transmission electron microscope (TEM) to measure the thickness of the carbonaceous film in the inner peripheral portion of the aggregate and the thickness of the carbonaceous film in the outer peripheral portion thereof, and the ratio of the average film thickness of the carbonaceous film (the thickness of the carbonaceous film in the inner peripheral portion/the thickness of the carbonaceous film in the outer peripheral portion) was calculated.

(4) Tap Density

The tap density was measured according to Japanese Industrial Standard JIS R 1628 "Test method for bulk density of fine ceramic powder."

(5) Coverage Rate of Carbonaceous Film

The carbonaceous film of the aggregate was observed using the transmission electron microscope (TEM) and an energy dispersive X-ray spectrometer (EDX) to calculate a ratio of a portion covered with the carbonaceous film on the surface of the aggregate, and this ratio was set to the coverage rate.

Evaluation results are shown in Table 1.

(Preparation of Lithium Ion Battery)

The electrode material, polyvinylidene fluoride (PVdF) as a binder, and acetylene black (AB) as a conductive auxiliary agent were mixed in a mass ratio of 90:5:5, and N-methyl-2-pyrrolidone (NMP) as a solvent was further added to the resultant mixture to give flowability, whereby slurry was prepared.

Then, the slurry was applied onto aluminum (Al) foil having a thickness of 15 μm, and was dried. Then, the aluminum foil was compressed at a pressure of 600 $kgf/cm^2$, whereby a positive electrode of a lithium ion battery of Example 1 was prepared.

A lithium metal as a negative electrode was disposed with respect to the positive electrode of the lithium ion battery, a separator formed from porous polypropylene was disposed between the positive electrode and the negative electrode, and the resultant member was set as a member for a battery.

On the other hand, ethylene carbonate and diethyl carbonate were mixed in a ratio of 1:1 (mass ratio), and 1 M $LiPF_6$ solution was further added to the resultant mixture, whereby an electrolyte having lithium ion conductivity was prepared.

Then, the member for a battery was immersed in the electrolyte, whereby a lithium ion battery of Example 1 was prepared.

(Evaluation of Lithium Ion Battery)

Internal resistance, and charge and discharge characteristics of the lithium ion battery were evaluated, respectively.

An evaluation method is as follows.

(1) Charge and Discharge Characteristics

A charge and discharge test of the above-described lithium ion battery was carried out under conditions of room temperature (25° C.), a cut-off voltage of 2 to 4.5 V, and a constant current at a charge and discharge rate of 1 C (discharge for one hour after charge of one hour).

The charge and discharge characteristics are shown in FIG. 1.

(2) Internal Resistance

In a discharge curve shown in FIG. 1, voltage drop recognized at a final stage of discharge represents presence of the electrode-active material not covered with the carbonaceous film. Accordingly, a sample in which the voltage drop was significantly recognized was determined as a sample with high internal resistance.

Here, a sample in which the voltage drop was not recognized or the voltage drop was small was evaluated as "O", and a sample in which the voltage drop was significantly recognized was evaluated as "X".

Example 2

An electrode material, and a positive electrode of the lithium ion battery were prepared in the same manner as Example 1 except that the stirring time of the ball mill was adjusted so that D90/D10 of the particle size distribution of the precursor particle of the electrode-active material in the slurry became 10. Then, evaluation was performed. Evaluation results are shown in Table 1.

In addition, in Example 2, the same voltage drop at the final stage of discharge as Example 1 was also recognized.

Example 3

An electrode material, and a positive electrode of the lithium ion battery were prepared in the same manner as Example 1 except that the stirring time of the ball mill was adjusted so that D90/D10 of the particle size distribution of the precursor particle of the electrode-active material in the slurry became 20. Then, evaluation was performed. Evaluation results are shown in Table 1.

In addition, in Example 3, the same voltage drop at the final stage of discharge as Example 1 was also recognized.

Example 4

An electrode material, and a positive electrode of the lithium ion battery were prepared in the same manner as Example 1 except that the stirring time of the ball mill was adjusted so that D90/D10 of the particle size distribution of the precursor particle of the electrode-active material in the slurry became 25. Then, evaluation was performed. Evaluation results are shown in Table 1.

In addition, in Example 4, the same voltage drop at the final stage of discharge as Example 1 was also recognized.

Comparative Example 1

An electrode material, and a positive electrode of the lithium ion battery were prepared in the same manner as Example 1 except that the stirring time of the ball mill was adjusted so that D90/D10 of the particle size distribution of the precursor particle of the electrode-active material in the slurry became 1.5. Then, evaluation was performed. Evaluation results are shown in Table 1, and the charge and discharge characteristics are shown in FIG. 1, respectively.

Comparative Example 2

An electrode material, and a positive electrode of the lithium ion battery were prepared in the same manner as Example 1 except that the stirring time of the ball mill was adjusted so that D90/D10 of the particle size distribution of the precursor particle of the electrode-active material in the slurry became 3. Then, evaluation was performed. Evaluation results are shown in Table 1.

Comparative Example 3

An electrode material, and a positive electrode of the lithium ion battery were prepared in the same manner as Example 1 except that the stirring time of the ball mill was adjusted so that D90/D10 of the particle size distribution of the precursor particle of the electrode-active material in the slurry became 40. Then, evaluation was performed. Evaluation results are shown in Table 1.

TABLE 1

| | D90/D10 | Average particle size of aggregate (μm) | Volume density of aggregate (vol %) | Maximum void of aggregate (%) | Ratio of average film thickness of carbonaceous film | Tab density (g/cm$^3$) | Internal resistance | Amount of carbon (parts by mass) | Coverage rate of carbonaceous film (%) |
|---|---|---|---|---|---|---|---|---|---|
| Example 1 | 7 | 6 | 61 | 80 | 0.7 | 1.1 | ○ | 1 | 93 |
| Example 2 | 10 | 4 | 68 | 78 | 0.8 | 1.3 | ○ | 1.1 | 99 |
| Example 3 | 20 | 2 | 75 | 73 | 2.0 | 1.2 | ○ | 1.8 | 100 |
| Example 4 | 25 | 1 | 78 | 65 | 3.0 | 1.4 | ○ | 2.2 | 100 |
| Comparative Example 1 | 1.5 | 21 | 42 | 82 | 0.1 | 0.9 | X | 0.3 | 65 |
| Comparative Example 2 | 3 | 24 | 48 | 84 | 0.1 | 0.9 | X | 0.5 | 78 |
| Comparative Example 3 | 40 | 0.4 | 85 | 52 | 7.0 | 0.8 | X | 12 | 100 |

According to the results described above, it can be seen that in the electrode materials of Examples 1 to 4, the ratio of the average film thickness of the carbonaceous film was within a range of 0.7 to 1.3, the tap density and the coverage rate of the carbonaceous film was high compared to the electrode materials of Comparative Examples 1 to 3, and unevenness in the supporting amount of the carbonaceous film formed on the surface of the electrode-active material was small. In addition, in the electrode materials of Examples 1 to 4, it can be seen that the internal resistance was low compared to the electrode materials of the Comparative Examples 1 to 3, and when being used as the electrode material of the lithium ion battery, the internal resistance may be reduced.

In addition, according to FIG. 1, in the electrode material of Example 1, the discharge capacity was large and discharge characteristics were excellent compared to the electrode material of Comparative Example 1.

(Second Embodiment)

An embodiment (second embodiment) of the electrode material and the method for producing the same of the invention will be described.

In addition, this embodiment makes a description in detail for easy comprehension of the gist of the invention, and does not limit the invention unless otherwise stated.

In addition, with respect to the redundant contents as that of the first embodiment, the description thereof may be omitted.

[Electrode Material]

The electrode material of this embodiment includes an aggregate formed by aggregating electrode-active material particles having a carbonaceous film formed on a surface, an average particle size of the aggregate is 0.5 to 100 μm, a pore size (D50) when an accumulated volume percentage of a pore size distribution of the aggregate is 50% is 0.1 to 0.2 μm, and porosity of the aggregate is 15 to 50 vol % with respect to a volume in a case in which the aggregate is a solid.

Here, it is assumed that a solid aggregate is an aggregate in which a void is not present at all, and a density of the solid aggregate is the same as a theoretical density of an electrode-active material.

The pore size distribution of the aggregate may be measured using a mercury porosimeter.

The pore size (D50) when the accumulated volume percentage of the pore size distribution of the aggregate is 50% is preferably 0.1 to 0.2 µm.

Here, the reason why D50 of the pore size distribution of the aggregate is limited is as follows. When D50 is less than 0.1 µm, the density inside the aggregate becomes too high, and thus a channel-shaped (network-shaped) void inside the aggregate decreases. As a result, a tarry material, which is generated during carbonization of the organic compound, is trapped inside the aggregate, and thus this range is not preferable. On the other hand, when D50 exceeds 0.2 µm, a vapor concentration of an aromatic carbon compound in the void inside the aggregate of the electrode-active material becomes too low, and thus the film thickness of the carbonaceous film in the inner peripheral portion of the outer shell of the aggregate becomes small. Therefore, the internal resistance of the electrode-active material increases, and thus this range is not preferable.

Similarly to the pore size distribution, the porosity of the aggregate may be measured using the mercury porosimeter.

It is preferable that the porosity of the aggregate be 15 to 50 vol % with respect to a volume in a case in which the aggregate is a solid, and more preferably 20 to 45 vol %.

Here, when the porosity of the aggregate is less than 15 vol % with respect to the volume in a case in which the aggregate is a solid, the density inside the aggregate becomes too high, and thus a channel-shaped (network-shaped) void inside the aggregate decreases. As a result, a tarry material, which is generated during carbonization of the organic compound, is trapped inside the aggregate, and thus this range is not preferable. On the other hand, when the porosity exceeds 50 vol % with respect to the volume in a case in which the aggregate is a solid, a vapor concentration of an aromatic carbon compound in the void inside the aggregate of the electrode-active material becomes too low, and thus the film thickness of the carbonaceous film in the inner peripheral portion of the outer shell of the aggregate becomes small. Therefore, the internal resistance of the electrode-active material increases, and thus this range is not preferable.

In addition, when the porosity of the aggregate is 50 vol % or less, the aggregate becomes dense, and the strength of the aggregate increases. Accordingly, for example, when the electrode-active material is mixed with the binder, the conductive auxiliary agent, and the solvent to prepare electrode slurry, the aggregate is not likely to collapse. As a result, an increase in viscosity of the electrode slurry is suppressed, and flowability is maintained. Accordingly, coating properties are improved, and filling properties of the electrode-active material in a coated film of the electrode slurry are also improved. In a case where the aggregate collapses during preparation of the electrode slurry, since a necessary amount of the binder that binds the electrode-active materials increases, the viscosity of the electrode slurry increases, and a concentration of a solid content of the electrode slurry decreases. As a result, a percentage of the electrode-active material in the weight of a positive electrode film decreases, and thus this case is not preferable.

When this aggregate is made into a shell-like aggregate having a void at the inside thereof, it is preferable that the size of the void that is formed inside the aggregate be 80% or less of a diameter of aggregate particles, and more preferably 70% or less.

Here, when the size (diameter) of the void exceeds 80% of the diameter of the aggregate particles, it is difficult to maintain a shell shape of the aggregate, and thus the concentration of the vapor of the aromatic carbon compound inside the void becomes too low. As a result, the film thickness of the carbonaceous film in the inner peripheral portion of the outer shell of the aggregate becomes small, and the internal resistance of the electrode-active material increases, and thus this range is not preferable.

In the electrode material of this embodiment, since the porosity of the aggregate is set to 15 to 50 vol % with respect to a volume in a case in which the aggregate is a solid, unevenness in a supporting amount of the carbonaceous film formed on the surface of the electrode-active material particles may be made small, and thus unevenness in conductivity of the electrode-active material may be reduced. In addition, when the electrode-active material in which the unevenness in conductivity is reduced is used as the electrode material of the lithium ion battery, a reaction related to intercalation and deintercalation of lithium ions may be uniformly carried out in the entirety of the surface of the electrode-active material, and thus the internal resistance may be reduced.

Here, the "internal resistance" described above represents internal resistance at a site at which reaction resistance related to intercalation and deintercalation of lithium ions is high in a particle, which does not have the carbonaceous film formed on a surface thereof or in which the thickness of the carbonaceous film is small, of the electrode-active material. Specifically, when the electrode-active material is used as the electrode-active material of the lithium ion battery, the internal resistance is shown as a magnitude of voltage drop at the final stage of discharge. That is, in an electrode-active material in which the intercalation and deintercalation reaction of lithium ions is uniformly carried out over the entirety of the surface of the electrode-active material, the voltage drop at the final stage of discharge is small. On the other hand, in an electrode-active material in which the intercalation and deintercalation reaction resistance of lithium ions is high at a part of the surface of the electrode-active material, the voltage drop at the final stage of discharge becomes significant.

According to the electrode material of this embodiment, the average particle size of the aggregate formed by aggregating electrode-active material particles having the carbonaceous film formed on a surface is set to 0.5 to 100 µm, and the pore size (D50) when the accumulated volume percentage of the pore size distribution of the aggregate is 50% is set to 0.1 to 0.2 µm, and the porosity of the aggregate is set to 15 to 50 vol % with respect to a volume in a case in which the aggregate is a solid. Accordingly, unevenness in a supporting amount of the carbonaceous film formed on the surface of the electrode-active material may be made small, and thus unevenness in conductivity of the electrode-active material may be reduced. As a result, when the electrode-active material is used as the electrode material of the lithium ion battery, the internal resistance may be reduced.

According to the method for producing an electrode material of this embodiment, the slurry, which contains the electrode-active material or the precursor of the electrode-active material, and the organic compound, and in which the ratio (D90/D10) of the particle size (D90) when the accumulated volume percentage of the particle size distribution of the electrode-active material or the precursor of the electrode-active material is 90% to the particle size (D10) when the accumulated volume percentage is 10% is 5 to 30, is dried; and the resultant dried product that is obtained is baked at 500° C. to 1,000° C. in a non-oxidizing atmosphere. Accordingly, unevenness in the supporting amount of the carbonaceous film formed on the surface of the electrode-active material may be reduced. As a result, an electrode material capable of reducing unevenness in conductivity of the electrode-active material may be easily produced.

Hereinafter, the second embodiment of the invention will be described in detail referring to Examples 5 to 9, and Comparative Examples 4 to 6, but the invention is not limited to these examples.

Example 5

(Preparation of Electrode Material)

4 mol lithium acetate ($LiCH_3COO$), 2 mol iron (II) sulfate ($FeSO_4$), and 2 mol phosphoric acid ($H_3PO_4$) were mixed to 2 L (liters) of water so that the entire amount became 4 L, whereby a uniform slurry mixture was prepared.

Then, this mixture was accommodated in an 8-L pressure-resistant airtight container, and hydrothermal synthesis was performed at 120° C. for one hour.

Then, a precipitate that was obtained was washed with water, whereby a cake-shaped precursor of the electrode-active material was obtained.

Then, 150 g (in terms of a solid content) of the precursor of the electrode-active material, an aqueous polyvinyl alcohol solution, which was obtained dissolving 20 g of polyvinyl alcohol in 200 g of water, as the organic compound, and 500 g of zirconia balls having a diameter of 5 mm as a medium particle were put into a ball mill, and a dispersion treatment was carried out after adjusting a stirring time of the ball mill so that D90/D10 of the particle size distribution of the precursor particle of the electrode-active material in the slurry became 7.

Then, the slurry that was obtained was sprayed in the air atmosphere at 180° C., and was dried to obtain a dried product having an average particle size of 6 μm.

Then, the dried product that was obtained was baked in a nitrogen atmosphere at 700° C. for one hour to obtain an aggregate having an average particle size of 6 μm, and this aggregate was set as an electrode material of Example 5.

(Evaluation of Electrode Material)

The pore size distribution (D50) of the aggregate of the electrode material, the porosity of the aggregate, the ratio of the average film thickness of the carbonaceous film (the thickness of the carbonaceous film in the inner peripheral portion/the thickness of the carbonaceous film in the outer peripheral portion), the tap density, and the coverage rate of the carbonaceous film were evaluated, respectively.

Evaluation method is as follows.

(1) Pore Size Distribution (D50) of Aggregate

The pore size distribution (D50) was measured using the mercury porosimeter.

(2) Porosity of Aggregate

The porosity of the aggregate was measured using the mercury porosimeter.

(3) Ratio of Average Film Thickness of Carbonaceous Film

The carbonaceous film of the aggregate was observed using a transmission electron microscope (TEM) to measure the thickness of the carbonaceous film in the inner peripheral portion of the aggregate and the thickness of the carbonaceous film in the outer peripheral portion thereof, and the ratio of the average film thickness of the carbonaceous film (the thickness of the carbonaceous film in the inner peripheral portion/the thickness of the carbonaceous film in the outer peripheral portion) was calculated.

(4) Tap Density

The tap density was measured according to Japanese Industrial Standard JIS R 1628 "Test method for bulk density of fine ceramic powder."

(5) Coverage Rate of Carbonaceous Film

The carbonaceous film of the aggregate was observed using the transmission electron microscope (TEM) and an energy dispersive X-ray spectrometer (EDX) to calculate a ratio of a portion covered with the carbonaceous film on the surface of the aggregate, and this ratio was set to the coverage rate.

Evaluation results are shown in Table 2.

(Preparation of Lithium Ion Battery)

The electrode material, polyvinylidene fluoride (PVdF) as a binder, and acetylene black (AB) as a conductive auxiliary agent were mixed in a mass ratio of 90:5:5, and N-methyl-2-pyrrolidone (NMP) as a solvent was further added to the resultant mixture to give flowability, whereby slurry was prepared.

Then, the slurry was applied onto aluminum (Al) foil having a thickness of 15 μm, and was dried. Then, the aluminum foil was compressed at a pressure of 600 $kgf/cm^2$, whereby a positive electrode of a lithium ion battery of Example 5 was prepared.

A lithium metal as a negative electrode was disposed with respect to the positive electrode of the lithium ion battery, a separator formed from porous polypropylene was disposed between the positive electrode and the negative electrode, and the resultant member was set as a member for a battery.

On the other hand, ethylene carbonate and diethyl carbonate were mixed in a ratio of 1:1 (mass ratio), and 1 M $LiPF_6$ solution was further added to the resultant mixture, whereby an electrolyte having lithium ion conductivity was prepared.

Then, the member for a battery was immersed in the electrolyte, whereby a lithium ion battery of Example 5 was prepared.

(Evaluation of Lithium Ion Battery)

Internal resistance, and charge and discharge characteristics of the lithium ion battery were evaluated, respectively.

An evaluation method is as follows.

(1) Charge and Discharge Characteristics

A charge and discharge test of the above-described lithium ion battery was carried out under conditions of room temperature (25° C.), a cut-off voltage of 2 to 4.5 V, and a constant current at a charge and discharge rate of 1 C (discharge for one hour after charge of one hour). An initial discharge capacity is shown in Table 3, and the charge and discharge characteristics are shown in FIG. 2, respectively.

(2) Internal Resistance

Figure 2:
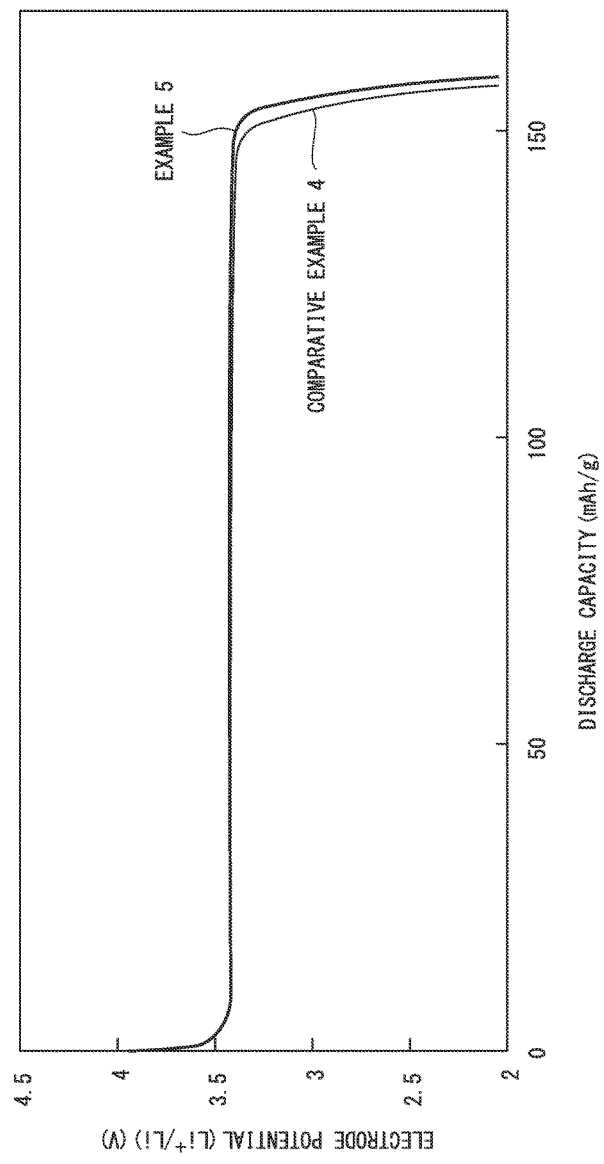
FIG. 2 is a diagram illustrating charge and discharge characteristics of Example 5 and Comparative Example 4 of the invention at room temperature, respectively.

In a discharge curve shown in FIG. 2, voltage drop recognized at a final stage of discharge represents presence of the electrode-active material not covered with the carbonaceous film. Accordingly, a sample in which the voltage drop was significantly recognized was determined as a sample with high internal resistance.

Here, a sample in which the voltage drop was not recognized or the voltage drop was small was evaluated as "O", and a sample in which the voltage drop was significantly recognized was evaluated as "X".

Evaluation results are shown in Table 3.

Example 6

An electrode material, and a positive electrode of the lithium ion battery were prepared in the same manner as Example 5 except that the stirring time of the ball mill was adjusted so that D90/D10 of the particle size distribution of the precursor particle of the electrode-active material in the slurry became 10. Then, evaluation was performed. Evaluation results are shown in Tables 2 and 3.

In addition, in Example 6, the same voltage drop at the final stage of discharge as Example 5 was also recognized.

Example 7

An electrode material, and a positive electrode of the lithium ion battery were prepared in the same manner as Example 5 except that the stirring time of the ball mill was adjusted so that D90/D10 of the particle size distribution of the precursor particle of the electrode-active material in the slurry became 20. Then, evaluation was performed. Evaluation results are shown in Tables 2 and 3.

In addition, in Example 7, the same voltage drop at the final stage of discharge as Example 5 was also recognized.

Example 8

An electrode material, and a positive electrode of the lithium ion battery were prepared in the same manner as Example 5 except that the stirring time of the ball mill was adjusted so that D90/D10 of the particle size distribution of the precursor particle of the electrode-active material in the slurry became 25. Then, evaluation was performed. Evaluation results are shown in Tables 2 and 3.

In addition, in Example 8, the same voltage drop at the final stage of discharge as Example 5 was also recognized.

Example 9

A precursor of an electrode-active material of Example 9 was obtained in the same manner as Example 5 except that manganese (II) sulfate ($MnSO_4$) as a manganese source was used instead of iron (II) sulfate ($FeSO_4$) as the iron source.

An electrode material and a positive electrode of the lithium ion battery of Example 9 were prepared in the same manner as Example 5 except that a precursor of iron lithium phosphate as a carbonization catalyst was added to the aqueous polyvinyl alcohol solution in the same mass as that of a polyvinyl alcohol solid content in the aqueous polyvinyl alcohol solution. Then, evaluation was performed. Evaluation results are shown in Tables 2 and 3.

In addition, in Example 9, the same voltage drop at the final stage of discharge as Example 5 was also recognized.

Comparative Example 4

An electrode material, and a positive electrode of the lithium ion battery were prepared in the same manner as Example 5 except that the stirring time of the ball mill was adjusted so that D90/D10 of the particle size distribution of the precursor particle of the electrode-active material in the slurry became 1.5. Then, evaluation was performed. Evaluation results are shown in Tables 2 and 3, and charge and discharge characteristics are shown in FIG. 2, respectively.

Comparative Example 5

An electrode material, and a positive electrode of the lithium ion battery were prepared in the same manner as Example 5 except that the stirring time of the ball mill was adjusted so that D90/D10 of the particle size distribution of the precursor particle of the electrode-active material in the slurry became 3. Then, evaluation was performed. Evaluation results are shown in Tables 2 and 3.

Comparative Example 6

An electrode material, and a positive electrode of the lithium ion battery were prepared in the same manner as Example 5 except that the stirring time of the ball mill was adjusted so that D90/D10 of the particle size distribution of the precursor particle of the electrode-active material in the slurry became 40. Then, evaluation was performed. Evaluation results are shown in Tables 2 and 3.

TABLE 2

| | D90/D10 | Average particle size of aggregate (μm) | Pore size distribution (D50) | Porosity (%) | Ratio of average film thickness of carbonaceous film | Tab density ($g/cm^3$) | Amount of carbon (parts by mass) | Coverage rate of carbonaceous film (%) |
|---|---|---|---|---|---|---|---|---|
| Example 5 | 7 | 6 | 0.19 | 39 | 0.7 | 1.1 | 1 | 93 |
| Example 6 | 10 | 4 | 0.18 | 32 | 0.8 | 1.3 | 1.1 | 99 |
| Example 7 | 20 | 2 | 0.16 | 25 | 2.0 | 1.2 | 1.8 | 100 |
| Example 8 | 25 | 1 | 0.13 | 22 | 3.0 | 1.4 | 2.2 | 100 |
| Example 9 | 7 | 4 | 0.15 | 43 | 1.2 | 1.1 | 2.4 | 93 |
| Comparative Example 4 | 1.5 | 21 | 0.25 | 58 | 0.1 | 0.9 | 0.3 | 65 |
| Comparative Example 5 | 3 | 24 | 0.25 | 52 | 0.1 | 0.9 | 0.5 | 78 |
| Comparative Example 6 | 40 | 0.4 | 0.08 | 2 | 7.0 | 0.8 | 12 | 100 |

TABLE 3

| | Initial discharge capacity (mAh/g) | Internal resistance |
|---|---|---|
| Example 5 | 157 | ○ |
| Example 6 | 158 | ○ |
| Example 7 | 159 | ○ |
| Example 8 | 159 | ○ |
| Example 9 | 150 | ○ |
| Comparative Example 4 | 135 | X |

TABLE 3-continued

|  | Initial discharge capacity (mAh/g) | Internal resistance |
|---|---|---|
| Comparative Example 5 | 140 | X |
| Comparative Example 6 | 149 | X |

According to the results described above, in the electrode materials of Examples 5 to 9, it can be seen that the ratio of the average film thickness of the carbonaceous film was within a range of 0.7 to 1.3, the tap density and the coverage rate of the carbonaceous film was high compared to the electrode materials of Comparative Examples 4 to 6, and unevenness in the supporting amount of the carbonaceous film formed on the surface of the electrode-active material was small. In addition, in the electrode materials of Examples 5 to 9, it can be seen that the internal resistance was low compared to the electrode materials of the Comparative Examples 4 to 6, and when being used as the electrode material of the lithium ion battery, the internal resistance may be greatly reduced.

In addition, according to FIG. 2, in the electrode material of Example 5, the discharge capacity was large and discharge characteristics were excellent compared to the electrode material of Comparative Example 4.

INDUSTRIAL APPLICABILITY

In the electrode material of the invention, the average particle size of the aggregate formed by aggregating electrode-active material having the carbonaceous film formed on a surface thereof is set to 0.5 to 100 μm, and the volume density of the aggregate is set to 50 to 80 vol % of the volume density in a case in which the aggregate is a solid. Accordingly, unevenness in a supporting amount of the carbonaceous film formed on the surface of the electrode-active material may be reduced. As a result, unevenness in conductivity of the electrode-active material may be reduced. In addition, when the electrode material is used as the electrode material of the lithium ion battery, the internal resistance may be reduced. Accordingly, a new improvement in the discharge characteristics of the lithium ion battery may be made, and the electrode material may be applied to a next-generation secondary battery in which better miniaturization, lightness, and high capacity are expected, and in the case of the next-generation secondary battery, the effect will be significant.

In addition, in another electrode material of the invention, the average particle size of the aggregate formed by aggregating the electrode-active material particles having the carbonaceous film formed on a surface thereof is set to 0.5 to 100 μm, the pore size (D50) when the accumulated volume percentage of the pore size distribution of the aggregate is 50% is set to 0.1 to 0.2 μm, and porosity of the aggregate is set to 15 to 50 vol % with respect to the volume in a case in which the aggregate is a solid. Accordingly, unevenness in a supporting amount of the carbonaceous film formed on the surface of the electrode-active material particles may be reduced. As a result, unevenness in conductivity of the electrode-active material may be reduced. In addition, when the electrode material is used as the electrode material of the lithium ion battery, the internal resistance may be greatly reduced. Accordingly, a new improvement in the discharge characteristics of the lithium ion battery may be made, and the electrode material may be applied to a next-generation secondary battery in which further miniaturization, lightness, and high capacity are expected, and in the case of the next-generation secondary battery, the effect will be significant.

We Claim:

1. A positive electrode material, comprising:
an aggregate formed by aggregating electrode-active material particles having a carbonaceous film formed on a surface,
wherein an average particle size of the aggregate is 0.5 to 100 μm,
a pore size (D50) when an accumulated volume percentage of a pore size distribution of the aggregate is 50% is 0.1 to 0.2 μm,
porosity of the aggregate is 15 to 50 vol % with respect to a volume of an aggregate in which a void is not present,
the aggregate has a plurality of voids at the inside, including a shell-like aggregate having a void at the inside, and a ratio of an average film thickness of the carbonaceous film in an outer peripheral portion and an inner peripheral portion of an outer shell of the shell-like aggregate (a thickness of the carbonaceous film in the inner peripheral portion/a thickness of the carbonaceous film in the outer peripheral portion) is 0.7 to 1.3,
a tap density of the aggregate is 1.0 to 1.5 g/cm$^3$,
the electrode-active material comprises $Li_xA_yD_zPO_4$ as a main component, wherein A is one or more selected from the group consisting of Co, Mn, Ni, Fe, Cu, and Cr; D is one or more selected from the group consisting of Mg, Ca, S, Sr, Ba, Ti, Zn, B, Al, Ga, In, Si, Ge, Sc, Y, and rare-earth elements; $0<x<2$; $0<y<1.5$; and $0<z<1.5$,
an amount of carbon in the carbonaceous film is 0.8 to 2.5 parts by mass on the basis of 100 parts by mass of the electrode-active material,
80% or more of the surface of the electrode-active material is covered with the carbonaceous film, and
an average particle size of primary particles of the electrode-active material particles is 0.02 to 5 μm.

2. The positive electrode material according to claim 1, wherein the aggregate has a structure in which the electrode-active materials having the carbonaceous film formed on a surface thereof are aggregated in a point contact state, and thus a contact portion of the electrode-active materials forms a neck shape, whereby channel-shaped voids inside the aggregate have a three-dimensionally expanded structure.

3. The positive electrode material according to claim 1, wherein the aggregate is a shell-like aggregate and the size of the void that is formed inside the aggregate is 80% or less of a diameter of aggregate particles.

4. The positive electrode material according to claim 1, wherein the electrode active material has a spherical shape.

5. A method for producing a positive electrode material according to claim 1, comprising:
spraying and drying slurry which contains an electrode-active material or a precursor of the electrode-active material, and an organic compound, and in which a ratio (D90/D10) of a particle size (D90) when an accumulated volume percentage of a particle size distribution of the electrode-active material or the precursor of the electrode-active material is 90% to a particle size (D10) when the accumulated volume percentage is 10% is 5 to 30; and
baking the resultant dried product that is obtained at 500° C. to 1,000° C. in a non-oxidizing atmosphere to obtain the electrode material;

wherein the electrode-active material comprises $Li_xA_yD_zPO_4$ as a main component, wherein A is one or more selected from the group consisting of Co, Mn, Ni, Fe, Cu, and Cr; D is one or more selected from the group consisting of Mg, Ca, S, Sr, Ba, Ti, Zn, B, Al, Ga, In, Si, Ge, Sc, Y, and rare-earth elements; $0<x<2$; $0<y<1.5$; and $0<z<1.5$.

6. The method for producing a positive electrode material according to claim 5, wherein the ratio (D90/D10) of D90 to D10 of a particle size distribution of the electrode-active material or the precursor of the electrode-active material is 7 to 25.

* * * * *